(12) United States Patent
Atwood et al.

(10) Patent No.: US 11,358,215 B2
(45) Date of Patent: Jun. 14, 2022

(54) THREE-DIMENSIONAL PRINTING SYSTEM AND METHOD OF THREE-DIMENSIONAL PRINTING

(71) Applicant: XEROX CORPORATION, Norwalk, CT (US)

(72) Inventors: Christopher D. Atwood, Webster, NY (US); Erwin Ruiz, Rochester, NY (US); Douglas K. Herrmann, Webster, NY (US); Ali R. Dergham, Fairport, NY (US); Derek A. Bryl, Churchville, NY (US)

(73) Assignee: XEROX CORPORATION, Norwalk, CT (US)

( * ) Notice: Subject to any disclaimer, the term of this patent is extended or adjusted under 35 U.S.C. 154(b) by 133 days.

(21) Appl. No.: 16/808,266

(22) Filed: Mar. 3, 2020

(65) Prior Publication Data

US 2021/0276081 A1 Sep. 9, 2021

(51) Int. Cl.
| | | |
|---|---|---|
| *B22D 23/00* | (2006.01) | |
| *B33Y 10/00* | (2015.01) | |
| *B33Y 30/00* | (2015.01) | |
| *B22F 3/10* | (2006.01) | |
| *B33Y 50/02* | (2015.01) | |
| *B22F 12/10* | (2021.01) | |
| *B22F 12/20* | (2021.01) | |
| *B22F 12/53* | (2021.01) | |
| *B22F 10/22* | (2021.01) | |

(52) U.S. Cl.
CPC ............ *B22D 23/003* (2013.01); *B33Y 10/00* (2014.12); *B33Y 30/00* (2014.12)

(58) Field of Classification Search
CPC ...... B22D 23/003; B33Y 30/00; B33Y 10/00; B33Y 50/02; B22F 2999/00; B22F 3/105; B22F 3/1017; B22F 12/10; B22F 12/20; B22F 12/53; B22F 10/22; B22F 2202/07; B22F 2003/1053; Y02P 10/25
See application file for complete search history.

(56) References Cited

U.S. PATENT DOCUMENTS

| | | | | |
|---|---|---|---|---|
| 9,616,494 | B2* | 4/2017 | Vader | B22F 10/22 |
| 10,040,119 | B2* | 8/2018 | Vader | B22F 12/53 |
| 10,668,535 | B2* | 6/2020 | Brown | G03F 7/0037 |
| 2015/0273577 | A1* | 10/2015 | Vader | B22F 10/22 |
| | | | | 164/46 |

(Continued)

FOREIGN PATENT DOCUMENTS

| | | | | |
|---|---|---|---|---|
| CN | 105499572 | * | 4/2016 | ............ B22F 10/00 |
| CN | 105499572 A | | 4/2016 | |

(Continued)

OTHER PUBLICATIONS

He et al.; 3D metal printer and preparation method of 3D printed metal workpiece; Sep. 2019; EPO English Machine Translation; pp. 1-5 (Year: 2021).*

(Continued)

*Primary Examiner* — Bayan Salone
(74) *Attorney, Agent, or Firm* — MH2 Technology Law Group LLP

(57) ABSTRACT

A three-dimensional printing system, the system comprising a build platform and a printhead for depositing a conductive print material at deposition contact points of a build surface on the build platform. A heating system comprises at least one induction coil for preheating the deposition contact points of the build surface.

20 Claims, 6 Drawing Sheets

(56) References Cited

U.S. PATENT DOCUMENTS

2017/0173877 A1* 6/2017 Myerberg ............. B29C 64/106
2018/0161873 A1* 6/2018 Brown ................... B33Y 10/00

FOREIGN PATENT DOCUMENTS

| CN | 106424725 A | | 2/2017 | | |
|---|---|---|---|---|---|
| CN | 107335806 A | | 11/2017 | | |
| CN | 108857031 | * | 11/2018 | ............. | B23K 13/01 |
| CN | 108857031 A | | 11/2018 | | |
| CN | 110216289 | * | 9/2019 | ............. | B22F 3/105 |
| CN | 110216289 A | | 9/2019 | | |
| KR | 20160090631 A1 | | 8/2016 | | |

OTHER PUBLICATIONS

Fan et al.; Extrusion spraying head of electromagnetic induction heating type 3D printer; Apr. 2016; EPO English Machine Translation; pp. 1-5 (Year: 2021).*
Sukhotskiy et al., "Magnetohydrodynamic Drop-on-Demand Liquid Metal 3D Printing," Solid Freeform Fabrication 2017: Proceedings of the 28th Annual International Solid Freeform Fabrication Symposium—An Additive Manufacturing Conference, pp. 1806-1811.
Karampelas et al., "Drop-on-Demand 3D Metal Printing," Informatics, Electronic and Microsystems: TechConnect Briefs 2017, pp. 153-155.
Vader Systems MK1 Printer Operator Manual 1.0, last revised Mar. 19, 2018, 114 pages.
Extended European Search Report dated Jul. 9, 2021 in corresponding European Applicaton No. 21157957.8, 8 pages.

* cited by examiner

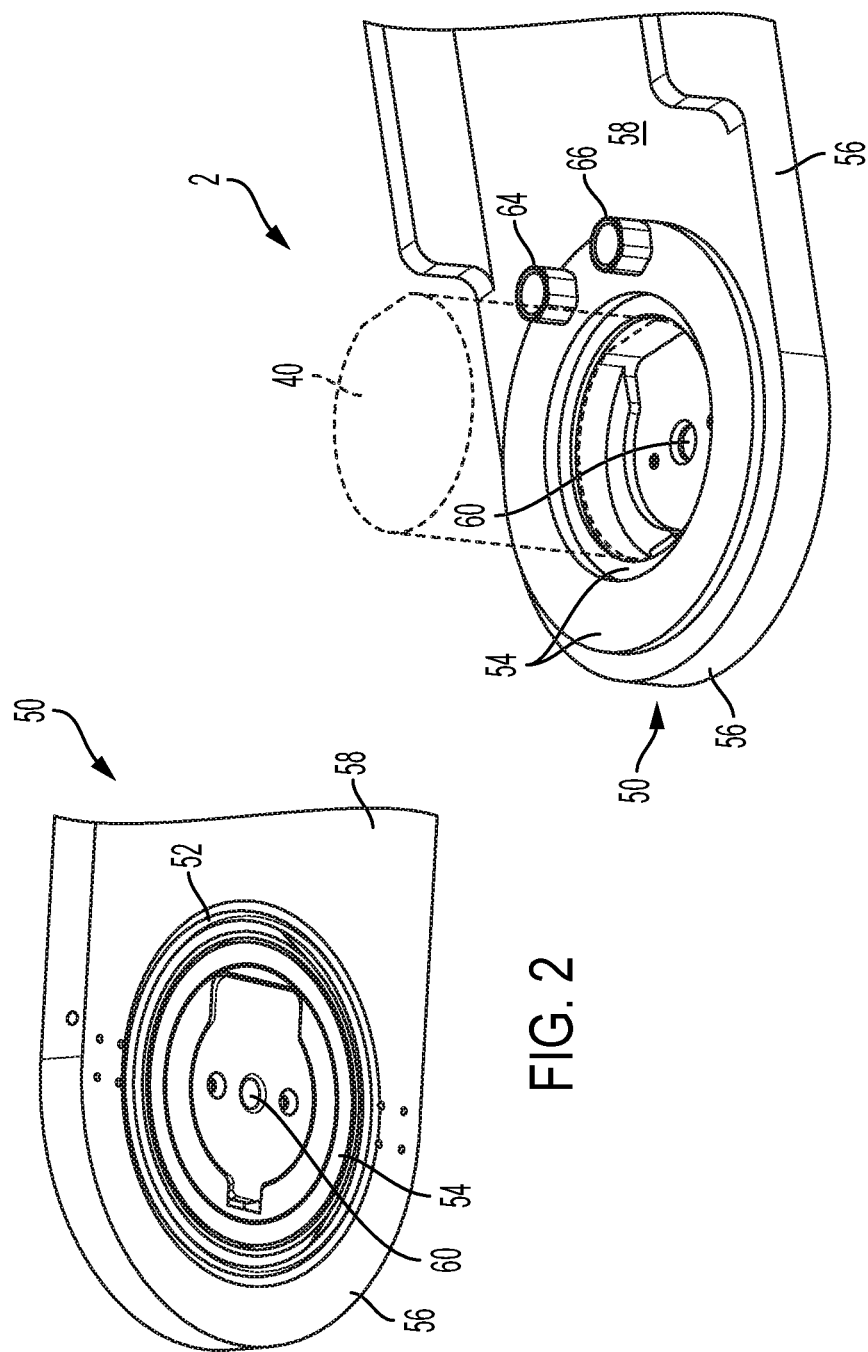

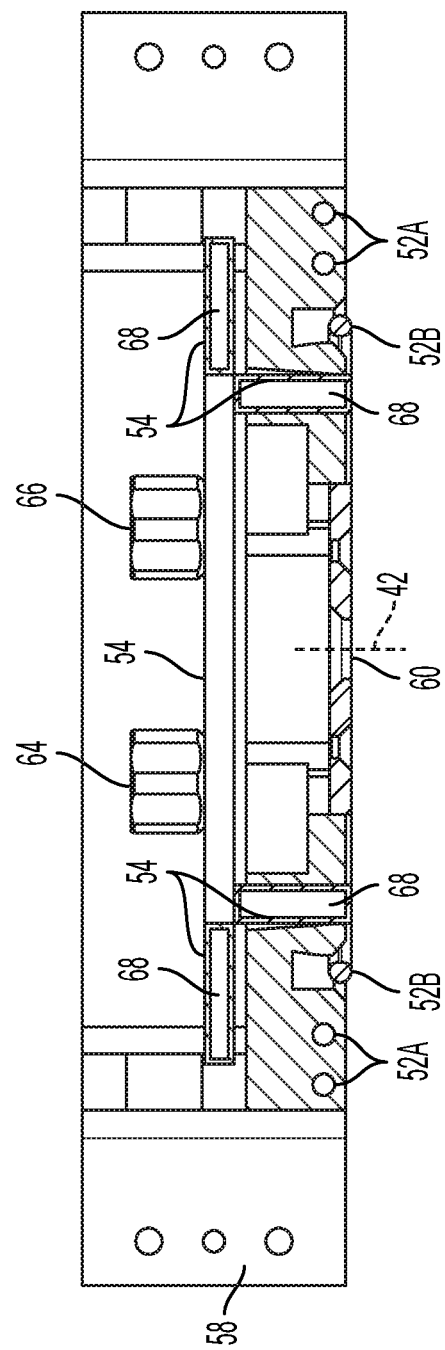

THREE-DIMENSIONAL PRINTING SYSTEM AND METHOD OF THREE-DIMENSIONAL PRINTING

FIELD OF THE DISCLOSURE

The present disclosure is directed to a three-dimensional printing system that includes a thermal containment system. A method of three-dimensional printing using a thermal containment system for heating a 3D object during fabrication is also disclosed.

BACKGROUND

Conductive liquid three-dimensional printers for building 3D objects from molten aluminum are known in the art. An example of such a system is disclosed in U.S. Pat. No. 9,616,494. The system works by using a DC pulse applied by an electromagnetic coil to expel molten aluminum drops in response to a series of pulses. The platen to which the drops are targeted translates to allow for the drops to be connected and built up to produce a three-dimensional object.

However, the drops of molten aluminum sometimes do not combine smoothly or with sufficient bonding strength. Further, the 3D object can have an undesirable degree of porosity, as well as uneven build surfaces during fabrication, unwelded drops, and shape inconsistencies. All of these lead to degraded physical properties such as fatigue strength and tensile strength, as well as poor appearance issues with the final object.

It has been known to use induction to melt metals being printed to a jetting temperature in a printhead, as described, for example, in U.S. Pat. No. 9,616,494. The heated metals are then 3D printed to form a desired 3D object.

Therefore, methods and systems for improving the quality of three-dimensional objects made from conductive liquid three-dimensional printers would be a step forward in the art.

SUMMARY

An embodiment of the present disclosure is directed to a three-dimensional printing system. The system comprises a build platform and a printhead for depositing a conductive print material at deposition contact points of a build surface on the build platform. A heating system comprises at least one induction coil for preheating the deposition contact points of the build surface.

Another embodiment of the present disclosure is directed to a method of three-dimensional printing. The method comprises inductively heating a build surface on a build platform so as to provide a preheated deposition contact point having a first deposition temperature. A print material is deposited from a printhead of a three-dimensional printing system on the preheated deposition contact point at the first deposition temperature.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serve to explain the principles of the present teachings.

FIG. 2 illustrates a bottom perspective view of a heating system, according to an embodiment of the present disclosure.

FIG. 3 illustrates a top perspective view of the heating system of FIG. 2, according to an embodiment of the present disclosure.

FIG. 4 illustrates a schematic side view showing certain cross-sectional details of a heating system, according to an embodiment of the present disclosure.

Figure 1:
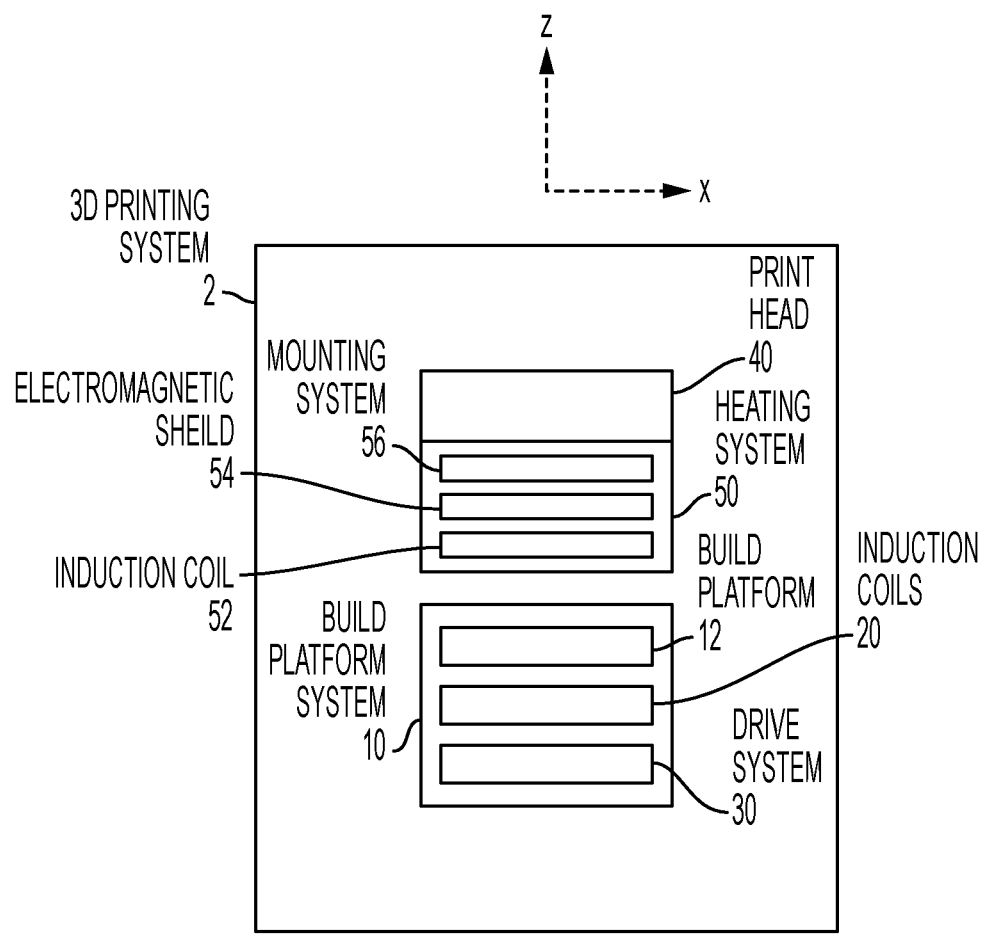
FIG. 1 shows a block diagram of a three-dimensional printing system, according to an embodiment of the present disclosure.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

Controlling the temperature of an object during 3D manufacturing can be important for various reasons. The temperature of the 3D object during manufacture can affect the 3D object properties, including the strength of the 3D object, porosity of the 3D object and overall quality of the appearance of the 3D object, among other things. This can be true for 3D objects made of various materials, including polymer objects, metal objects and so forth.

As an example, during the printing process of molten metal by a conductive liquid three-dimensional printer, the temperature differential between a molten drop ejected from the printer and a build surface causes inconsistencies with the build strength, porosity and surface finish of the final 3D object. Testing has shown that to properly fuse the molten metal to the base build material the receiving surface temperature can be controlled to a desired deposition temperature. The desired deposition temperature will vary depending on the material being deposited. For aluminum (e.g., pure aluminum or aluminum alloys) this deposition temperature is about 400° C. to about 550° C., or higher. The conductive liquid three-dimensional printer system uses a heated build platform set to, for example, about 400° C., to heat the initial layers. However, as the 3D object continues to grow, the heating from the build platform is unable to maintain the desired temperature on the upper surface of the 3D object so as to ensure a good bond between the molten drop and the 3D object.

The present disclosure is directed to a three-dimensional printing system (sometimes referred to herein as a 3D printer) that employs induction for heating and/or maintaining the temperature of a 3D object as it is being printed. Induction provides a number of advantages in this application, in part, because electromagnetic flux from induction transfers a significant portion of the energy to the surface of the conductive material, meaning that induction will efficiently heat the top surface of the conductive 3D object. For example, heating by induction can be greater than 90% efficient and can keep energy costs relatively low. Thus, heating a conductive 3D part during 3D printing by inductive methods has been found to be more efficient than heating with various other methods, such as IR heaters, convection with hot gas and so forth. Further advantages of the system and method of the present disclosure include one or more of the following: improved safety compared with traditional IR heating methods because induction does not transfer energy directly to non-conductive materials, such as human hands; improved safety compared with ceramic heaters or other heaters that have very long cool down times inside the printer; the ability to allow for improved 3D printed object properties, such as lower porosity, higher yield strength, higher fatigue cycles and/or surface quality; the ability to maintain a desired temperature of the 3D object and/or control cooling to improve material bonding and material properties during the 3D print; the ability to allow for heating the entire object (e.g., entire volume of the object) being printed regardless of changes in direction of the object during printing; and the ability to improve build properties, such as surface appearance and other 3D object properties.

FIG. 1 illustrates a block diagram of a three-dimensional printing system 2, according to an embodiment of the present disclosure. The three-dimensional printing system 2 comprises a build platform system 10 including a build platform 12 on which a three-dimensional object may be built. The build platform system 10 may also include one or more optional induction coils 20 and an optional drive system 30. A 3D printer printhead 40 is disposed in proximity to the build platform system 10 for depositing a conductive print material at deposition contact points of a build surface on the build platform 12. The build surface can be a surface of the build platform 12 or a surface of a 3D object being built on the build platform 12.

The three-dimensional printing system 2 also includes a heating system 50 to which the printhead 40 is affixed. The heating system 50 can be positioned, for example, between the build platform 12 and the printhead 40. The heating system 50 comprises at least one induction coil 52, an optional electromagnetic shield 54 for shielding the printhead from the electromagnetic flux induced by the induction coil 52, and a mounting system 56 for affixing the printhead 40 to the heating system 50.

FIG. 2 illustrates a bottom perspective view and FIG. 3 illustrates a top perspective view of a heating system 50, according to an embodiment of the present disclosure. The heating system 50 includes at least one induction coil 52 and a mounting system 56 in the form of a printhead mount plate 58 on which the printhead 40 may be attached. For purposes of clarity, the position where a printhead 40 may be attached is shown by the dashed lines of FIG. 3. The printhead mounting system 56 comprises an ejection port 60 positioned to provide an opening configured to allow conductive material from the printhead 40 to be deposited to form a 3D object on the build platform 12.

In an embodiment, the at least one induction coil 52 is positioned so that when print material is ejected from the ejection port 60 during printing, the material will pass through a planar region encircled by the induction coil 52. In other words, an ejection path 42 (illustrated by the dashed line in FIG. 4) of the printhead 40 passes through the planar region encircled by the induction coil 52. The heating system 50 can comprise any number of induction coils 52, such as 1 to 10 coils or more, such as 2 to 8 coils or, 3, 4, 5, 6 or 7 coils. These coils are distinguished from any coils that may be employed in operation of the printhead 40, such as coils 510 (FIG. 7) described below. Using a plurality of coils can apply greater flux to the part to heat more quickly. The coils 52 can have any desired geometric configuration. As an example, the coils can be in a concentric configuration, as shown in FIG. 4. Outer coils 52A that are farther from a printhead nozzle can be lower power, while inner coils 52B nearer the printhead nozzle can be at a relatively higher power. This arrangement could allow flux lines from the lower power outer coils to engage a broader area of the 3D object being printed to elevate the temperature of the 3D object surface to just below a desired deposition temperature, while flux lines from the inner coils could engage an area closer of the 3D object closer to where print material is deposited to provide a final burst of energy to increase temperature to the desired print temperature just before printing at that point. Still other coil configurations could be employed in place of, or in addition to, those discussed herein.

The printhead mount plate 58 comprises a non-conductive material so that it will not be directly heated by the flux from the induction coils 52. Any suitable non-conductive material can be employed that provides the desired structural characteristics, such as ceramics, high temperature plastics, or other materials.

The heating system 50 illustrated in FIGS. 2 and 3 further comprises an electromagnetic shield 54 that is positioned between the printhead 40 and the at least one induction coil 52. A clearer view of the electromagnetic shield is shown in FIG. 4. The electromagnetic shield 54 can shield the printhead 40 from the flux generated by the induction coil 52, which could damage and/or interfere with the operation of, the printhead 40. The electromagnetic shield 54 comprises a material chosen from a magnetic material, a conductive material, or a combination thereof. Examples of suitable conductive materials include metals such as aluminum, copper, brass, bronze, iron, steel, silver, gold, graphite, carbon, silicon carbide, or composites or alloys of any of these materials.

In an embodiment, the printhead mount plate further comprises a cooling system for cooling the electromagnetic shield 54 during operation of the three-dimensional printing system 2. The cooling system can comprise, for example, a coolant inlet 64, a coolant outlet 66 and a conduit 68 fluidly connecting the coolant inlet and the coolant outlet. In an embodiment, as shown in FIG. 4, the electromagnetic shield 54 is hollow and acts as the conduit 68. During 3D printing, coolant water can flow through the electromagnetic shield 54 and remove thermal energy therefrom, thereby preventing overheating. Any other desired techniques for cooling the electromagnetic shield 54 can also be employed.

In an embodiment, a position of the printhead 40 and the heating system 50 are both adjustable along a z-axis, as shown in FIG. 1. Using the mounting system 56, the printhead 40 is attached to the heating system 50, including the induction coil 52, so that when the printhead 40 moves up and down along the z-axis, the induction coil 52 also moves along the z-axis. During printing, the printhead 40 and induction coil 52 can be lowered into position over the build platform 12 so as to be at a desired distance from a build surface (which may be a surface of the 3D object being built, or a surface of the build platform 12 itself). As the 3D object is printed on the build platform 12, both the printhead 40 and the at least one induction coil 52 can be raised to accommodate the increasing size of the 3D object as successive layers of the 3D object are deposited on the build surface, while simultaneously heating the build surface using the coil 52.

As is well known in the art, the position of the build platform 12 can be adjustable along the x-axis and the y-axis of an XY plane (where the y-axis is into the page in FIG. 1), so as to allow the print material from the printhead 40 to be deposited in a desired location on the build platform 12 during printing. Alternatively, the relative movement of the build platform 12 with respect to the printhead 40 can be carried out in any other suitable manner. For example, the build platform 12 can move along the z-axis while the printhead 40 moves along the x-axis and the y-axis of an XY plane. In yet other embodiments, one of either the build platform 12 or the printhead 40 could remain stationary while the other is moved along the x, y, and z axes to provide the relative movement of the build platform 12 and printhead 40 to accomplish the 3D printing.

Figure 5:
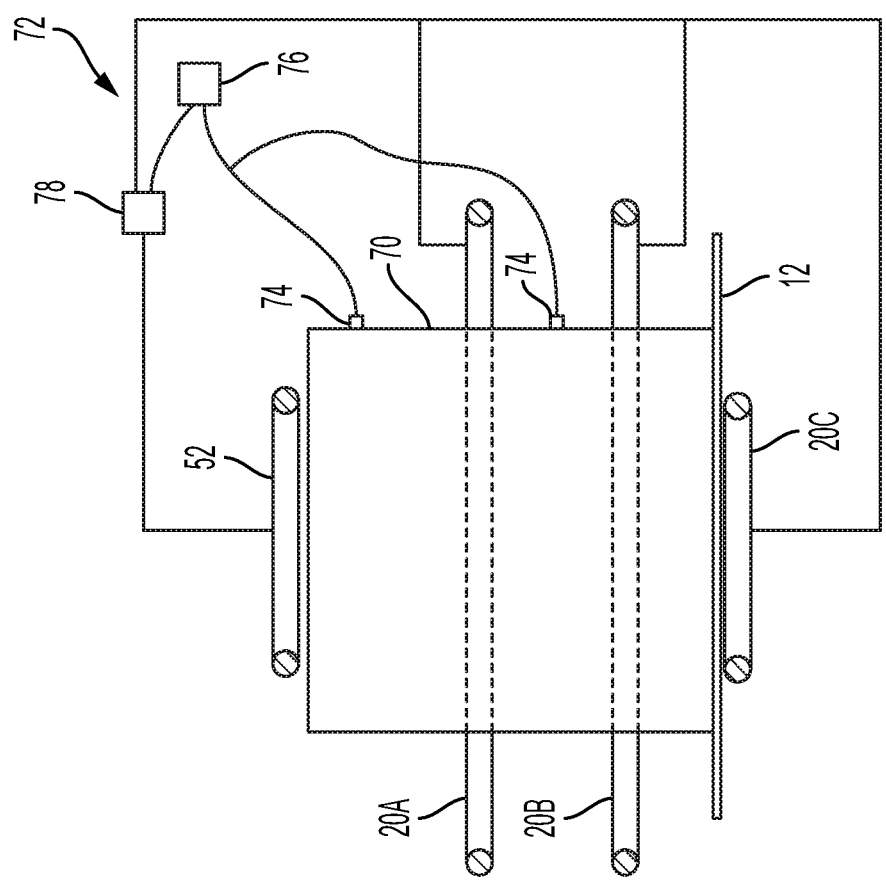
FIG. 5 illustrates a schematic side view of an arrangement of induction coils attached to a build platform, according to an embodiment of the present disclosure.

Referring to FIG. 1, in addition to the build platform 12, the build platform system 10 can optionally comprise one or more induction coils 20. Induction coils 20 are configured to provide thermal energy for heating a 3D object being deposited on the build platform 12, in addition to the thermal energy that is provided by induction coil 52. In an embodiment, while induction coil 52 moves relative to the 3D object being printed, the one or more induction coils 20 may be stationary with respect to the 3D object, so as to provide additional thermal control for heating and cooling of the entire 3D object before, during and/or after the printing process. FIG. 5 illustrates one example of an arrangement of induction coils 20A, 20B, 20C and 52 as employed for heating a 3D object 70. As shown in FIG. 5, one or more coils 20A, 20B can be positioned around a periphery (e.g., completely around the periphery) of the 3D object 70 for heating the volume of the 3D object. One or more additional coils 20C can be positioned under the build platform 12 for heating the build platform 12 and/or the volume of the 3D object 70 proximate to the build platform 12. The optional coils 20A, 20B and/or 20C can be attached to the build platform using any desired mechanism, as would be understood by one of ordinary skill in the art. While the coils 52, 20A, 20B and 20C may be employed together in the same system, it is also contemplated that any of the coils could be employed alone. For example, the 3D printing system 2 could include only coils 20A and 20B, or only coil 20C, or all of coils 20A, 20B and 20C, without including a coil 52. Alternatively, the at least one coil 52 can be employed with any one, two or all three of coils 20A, 20B and 20C. Still other coil arrangements may be possible for effectively heating 3D object 70, as would be understood by one of ordinary skill in the art.

In an embodiment, the build platform 12 comprises a material that is non-conductive, such as ceramic or glass. Such non-conductive materials are not directly heated by the coils 20 or 52, thereby allowing the thermal energy from the induction coils to be focused on the 3D object 70 while avoiding a potentially lengthy heat up time of the build platform 12, saving process time and energy. Alternatively, the build platform 12 comprises a material that is conductive. Suitable conductive materials include metals, such as aluminum, copper or any other metal. In the case where the build platform 12 comprises a conductive material, the build platform 12 can be heated by the induction coils 20. Inductive heaters can apply more power to heat the build platform 12 more quickly than cartridge-type resistive heaters, which are typically used for heating build platforms. Thus, employing an inductively heated build platform may significantly reduce warmup times compared to build plates heated with conventional cartridge-type resistive heaters.

The three-dimensional printing system 2 can include a system for controlling the temperature of the 3D object, such as, for example, a closed-loop temperature control system 72. Such a closed loop system 72 may comprise one or a plurality of temperature sensors 74 for determining (e.g., mapping) a temperature of the 3D object being printed and a feedback loop. The feedback loop can comprise, for example, a processor 76 and one or more controllers 78 for controlling the power to the induction coils 20, 52 based on input provided by temperature sensors 74. While temperature sensors 74 are illustrated in contact with the 3D object, they may instead be non-contact sensors, such as thermal imaging sensors or sensors that measure flux of infrared radiation. The temperature control system can be used to measure and control temperature of only a portion of the 3D object surface, such as near the print material deposition point, or they could be used to measure and control the temperature for the entire 3D object, so as to control cooling rate and thereby control material properties of the finished 3D object.

The printhead 40 can be any printhead useful for 3D printing. Various suitable types of 3D printers that employ printheads are known in the art, such as extrusion type printheads. Another example are printheads configured for ejecting drops of a conductive liquid print material (e.g., molten aluminum or other liquid metals) onto the build platform 10, as will now be described in detail with respect to FIGS. 6 and 7. The printhead of FIGS. 6 and 7 comprises an electromagnetic coil for applying a DC pulse for ejecting the drops.

Figure 6:
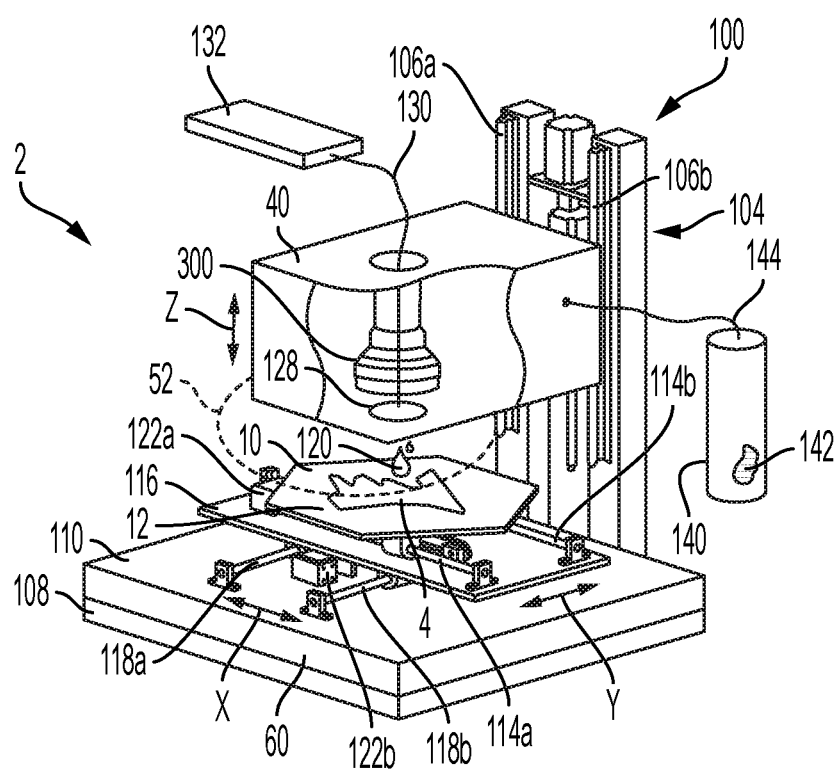
FIG. 6 shows a perspective, schematic view of a three-dimensional printing system with a portion of the printhead cover cutaway to show details of the printhead, according to an embodiment of the present disclosure.

FIG. 6 illustrates an example of a conductive liquid three-dimensional printing system, referred to herein as a liquid metal 3D printer 100. Drops of liquid metal that are used to form a three-dimensional metal object are produced by a printhead 40 supported by a tower 104. The printhead 40 is affixed to vertical z-axis tracks 106a and 106b and can be vertically adjusted, represented as movement along a z-axis, on tower 104. Tower 104 is supported by a frame 108 manufactured, for example, from steel tubing or any other suitable material. An induction coil 52, as described herein for heating the 3D object is represented as a dashed line. Any of the heating systems 50 and/or build platform systems 10 as described herein could be employed with the 3D printer of FIGS. 6 and 7.

Proximate to frame 108 is a base 60, formed of, for example, granite or other suitable material. Base 60 supports the build platform 12 upon which a 3D object is formed. Build platform 12 is supported by x-axis tracks 114a and 114b, which enable build platform 12 to move along an x-axis. X-axis tracks 114a and 114b are affixed to a stage 116. Stage 116 is supported by y-axis tracks 118a and 118b, which enable stage 116 to move along a y-axis.

As drops of molten metal (e.g., molten aluminum, silver, copper or other suitable metal) 120 fall onto build platform 12, the programmed horizontal movement of build platform 12 along the x and y axes results in the formation of a three-dimensional object. The programmed movement of stage 116 and build platform 12 along x-axis tracks 114a and 114b, and y-axis tracks 118a and 118b can be performed by means of, for example, an actuator 122a and 122b, as would be known to a person of ordinary skill in the art. The actuators 122a and 122b and tracks make up a drive system for the build platform 10. Liquid metal 3D printer 100 was designed to be operated in a vertical orientation, but other orientations could also be employed.

FIG. 6 also shows a source of aluminum 132 and aluminum wire 130. Alternative embodiments may utilize aluminum in bar, rod, granular or additional forms. In alternative embodiments, any sufficiently conductive liquid or colloidal mixture could be used in place of aluminum with the proper adjustments to the system, as would be understood by one of ordinary skill in the art. The term aluminum as used herein is defined to include both pure aluminum and aluminum alloys, such as, for example, the 300 series (e.g., 356), 2000 series, 3000 series, 4000 series (e.g., 4043), 5000 series, 6000 series (e.g., 6061), 7000 (e.g., 7075) series and 8000 series of alloys, or any other aluminum alloys suitable for 3D printing. Pure aluminum is defined as being 99% by weight aluminum or higher, such as about 99.5% by weight to about 100% aluminum, and includes, for example, the 1000 series of aluminum.

Printhead 40 includes a nozzle pump 300. Printhead 40 and a method of operating the printer are described in greater detail in U.S. Pat. No. 9,616,494, the disclosure of which is incorporated herein by reference in its entirety.

Figure 7:
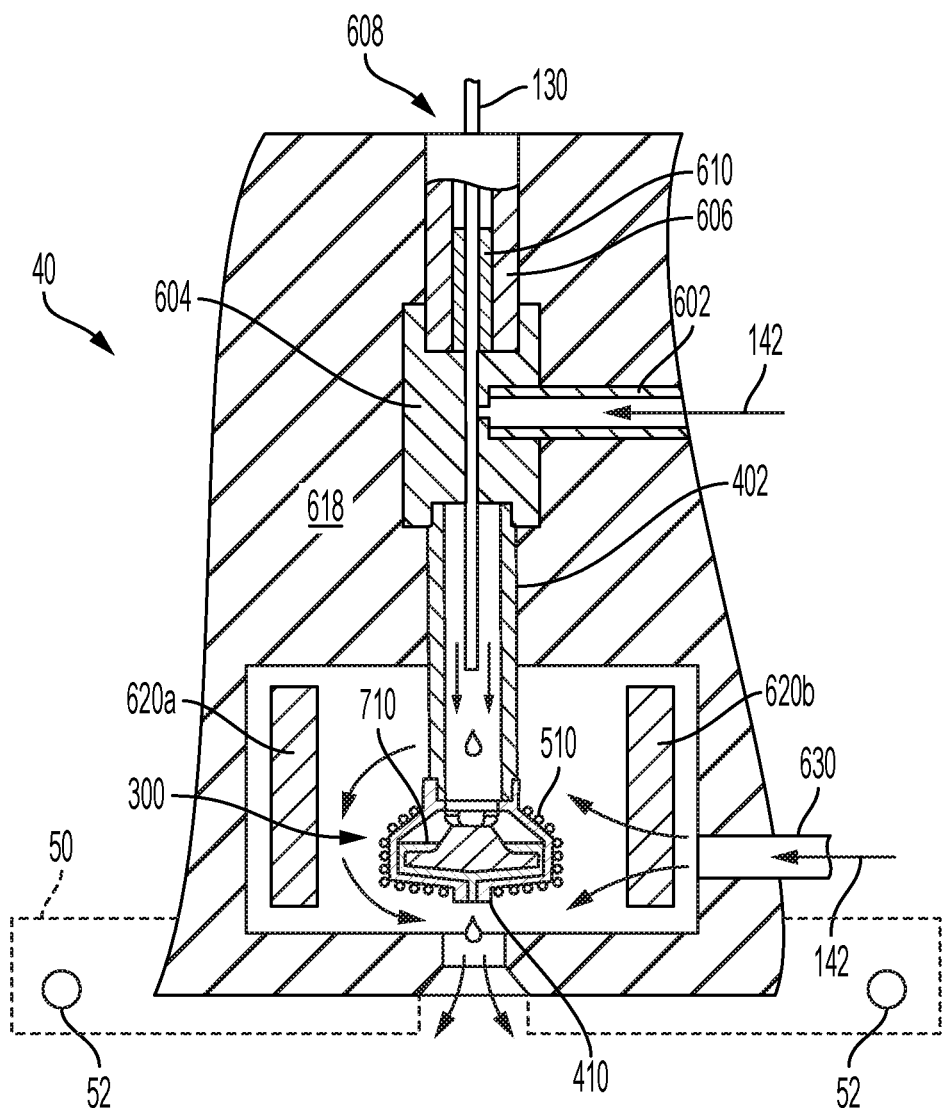
FIG. 7 shows a cross sectional view of the printhead shown in FIG. 6, with dashed lines representing the outline of a heating system attached to the printhead, according to an embodiment of the present disclosure.

FIG. 7 illustrates a cross-sectional view of a portion of printhead 40, which includes a cooled wire inlet 608, an outer sleeve 606, and the nozzle pump 300 enclosed by an electromagnetic coil 510. A heating system 50 comprising an induction coil 52 for heating the 3D object being printed, as described herein, is represented as a dashed line. In an embodiment, aluminum wire 130 is fed into cooled wire inlet 608 and a wire guide and gas seal 610 made of copper. The aluminum wire 130 then passes through an insulating coupler 604, made, for example, of Macor ceramic, where inert gas 142 is supplied through the melt shield gas inlet port 602, also made of, for example, Macor ceramic, to apply a protective inert gas 142 shield before the aluminum is melted.

Melted aluminum, or other electrically conductive liquid, flows downward under gravity and positive pressure exerted by inert gas 142 along a longitudinal z-axis to nozzle pump 300. Electrical heating elements 620a and 620b, made of, for example, nichrome, heat the interior of a furnace 618, made of, for example, firebrick, to a desired temperature (e.g., above the 660° C., which is the melting point of aluminum). The thermally conductive tundish 402 transmits heat to aluminum wire 130, as supplied from a source of aluminum 132, causing it to melt as it enters nozzle pump 300. Tundish 402 can comprise, for example, boron nitride or other suitable thermally conductive material.

The molten aluminum flows downward to form a charge of molten aluminum 710. Charge of molten aluminum 710 is contained primarily within a pump chamber of nozzle pump 300. Electromagnetic coil 510 is shaped to surround nozzle pump 300. The pressure on the inert gas 142 inside nozzle pump 300 is adjusted to overcome surface tension at the nozzle 410 in order to form a convex meniscus (not shown). This pressure is determined by Young's law as P=2×surface tension/orifice radius of the nozzle 410.

The electromagnetic coil 510 is shaped around nozzle pump 300 in such a way as to focus magnetic field lines vertically through the charge of molten aluminum 710. Nozzle pump 300 is transparent to the magnetic field. The electromagnetic coil 510 applies forces to the charge of molten aluminum 710 to pump liquid metal based on the principles of magnetohydrodynamics. A step function direct current (DC) voltage profile applied to the electromagnetic coil 510 causes a rapidly increasing applied current to electromagnetic coil 510, thereby creating an increasing magnetic field that follows magnetic field lines. The optimal range of voltage for the pulse and current strength, as well as the range of time durations for the pulse, for effective operation vary depending on the electrical resistivity of the fluid, viscosity and surface tension. The possible effective range is wide, where alternative embodiments could optimally range from 10 to 1000 volts (V) and 10 to 1000 amperes (A).

According to Faraday's law of induction, the increasing magnetic field causes an electromotive force within the pump chamber, which in turn causes an induced current in molten aluminum 710 to flow along circular paths through the charge of molten aluminum 710. The induced current in molten aluminum 710 and the magnetic field produce a resulting radially inward force on molten aluminum, known as a Lorenz force, in a ring shaped element through the charge of molten aluminum 710. The radially inward force on molten aluminum is proportional to the square of the DC voltage applied.

A peak pressure occurring at the inlet to the nozzle 410 is also proportional to the square of the DC voltage applied. This pressure overcomes surface tension and inertia in the molten aluminum to expel the drop of molten aluminum. At the same time, a computer causes stage 116 to move to deposit the drop of molten aluminum in the desired location on build platform 12 (e.g., on the 3D object being printed).

An embodiment of the present disclosure is directed to a method of three-dimensional printing. The method comprises: (a) inductively heating a build surface on a build platform so as to provide a preheated deposition contact point having a first deposition temperature; and (b) depositing a print material from a printhead of a 3D printer on the preheated deposition contact point at the first deposition temperature. In an embodiment, the print material is a liquid, such as a molten metal or other liquid, that results in a conductive object after being cooled. As an example, the molten metal comprises at least one metal chosen from aluminum, copper and silver. In another embodiment, the print material can be any other type of material (e.g., a conductive polymer paste or metal paste), that after cooling or drying can be heated by induction. The build surface can be a surface of a conductive 3D object being built on the build platform, or a surface of the platform itself.

A print material is deposited onto the build surface using any of the 3D printers described herein to form a 3D object. The method comprises depositing the print material, such as by, for example, ejecting a first drop of a molten metal from the printhead so as to deposit the first drop on the preheated deposition contact point at a first deposition temperature, as described herein above. The method further comprises adjusting the position of the top plate portion and the printhead along a z-axis. The method further comprises adjusting the position of the build surface along an x-axis, a y-axis or both the x-axis and the y-axis.

The deposition temperature will depend on the type of print material being deposited. For aluminum, as an example, the deposition temperature ranges from about 400° C. to about 800° C., such as about 400° C. to about 600° C., or about 400° C. to about 550° C.

The method may further comprise adjusting the position of at least one induction coil relative to the build surface and repeating the processes of a) and b) above. For example, adjusting the position of the induction coil 52 relative to the build platform may include moving the induction coil and the printhead along a z-axis and/or moving the build platform along an x-axis, a y-axis or both the x-axis and the y-axis.

In an embodiment, the method further comprises controlling a temperature of the 3D object by determining an amount of heat energy to be applied to the portion of the build surface to achieve the deposition temperature based on one or more of the geometry of the portion of the build surface, the distance of the portion of the build surface from the build platform, the temperature of the build platform and the temperature of the build surface (e.g., the temperature at or in proximity to the deposition contact point). The power to the coil can be controlled based on the amount of heat energy to be applied to a portion of the build surface. A temperature feedback loop, as described herein, including one or more thermal sensors, a computer and one or more controllers, can be used to control the temperature of the 3D object during printing.

The power and/or frequency of the induction coils can be controlled in order to achieve the desired temperatures of the 3D object. Any suitable amount of power can be provided to the induction coils 20, 52. For example, the power to each of the induction coils 20, 52 can be individually controlled to be within a range of from about 1 KW to about 50 KW, such as about 5 KW to about 20 KW. Further, the alternating current frequency to the induction coils 20, 52 can be individually controlled to be within a range of from about 10 Hz to about 1 MHz, such as about 10 kHz to about 100 kHz.

In an embodiment, the printhead 40 further includes an induction coil 510 for ejecting the print material as described herein with respect to FIGS. 6 and 7. The method further comprises protecting the printhead 40 from magnetic flux generated by the coils 20, 52 using conductive shielding positioned between the induction coils 20, 52 and the printhead. The shielding can be cooled using a cooling fluid such as water, as also described herein.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A three-dimensional printing system, the system comprising:
    a build platform;
    a printhead for depositing a conductive print material at deposition contact points of a build surface on the build platform; and
    a heating system comprising at least two induction coils for preheating the deposition contact points of the build surface, the at least two induction coils being concentric and being positioned between the build platform and the printhead, the at least two induction coils comprising an inner coil and an outer coil, the inner coil having a smaller diameter than the outer coil.

2. The system of claim 1, wherein the printhead comprises an electromagnetic coil for applying a DC pulse for ejecting liquid drops of the conductive print material at the deposition contact points.

3. The system of claim 1, wherein the heating system is affixed to the printhead, the heating system comprising the at least two induction coils and a mounting system for affixing the printhead to the heating system.

4. The system of claim 3, wherein including the at least two induction coils, the heating system includes 2 to 10 coils.

5. The system of claim 3, wherein the mounting system comprises a printhead mount plate on which the printhead is disposed, the printhead mount plate comprising an ejection port positioned to provide an opening configured to allow conductive material from the printhead to be deposited to form a 3D object on the build platform, the at least two induction coils surrounding the ejection port, and further wherein the printhead mount plate comprises a non-conductive material.

6. The system of claim 5, wherein the printhead mount plate further comprises an electromagnetic shielding positioned between the printhead and the induction coil, the electromagnetic shielding comprising a conductive material, a magnetic material or a combination thereof.

7. The system of claim 6, wherein the printhead mount plate further comprises a cooling system comprising a coolant inlet, a coolant outlet and a conduit fluidly connecting the coolant inlet and the coolant outlet.

8. The system of claim 7, wherein the shielding is hollow and is the conduit.

9. The system of claim 1, wherein the build platform further comprising one or more induction coils configured to inductively heat a 3D object being deposited on the build platform.

10. The system of claim 9, wherein the build platform comprises a material that is non-conductive.

11. The system of claim 9, wherein the build platform comprises a material that is conductive.

12. A method of three-dimensional printing, the method comprising: a) inductively heating a build surface on a build platform with a heating system so as to provide a preheated deposition contact point having a first deposition temperature, the heating system comprising at least two induction coils being concentric and being positioned between the build platform and a printhead, the at least two induction coils comprising an inner coil and an outer coil, the inner coil having a smaller diameter than the outer coil; and b) depositing a print material from a printhead of a three-dimensional printing system on the preheated deposition contact point at the first deposition temperature.

13. The method of claim 12, wherein the print material is a molten metal.

14. The method of claim 13, wherein the molten metal is aluminum.

15. The method of claim 12, wherein the deposition temperature ranges from about 400° C. to about 800° C.

16. The method of claim 12, wherein the build surface is a surface of a 3D object being built on the build platform.

17. The method of claim 12, further comprising adjusting the position of at least two induction coils relative to the build surface and repeating the processes of a) and b).

18. The method of claim 17, further comprising determining an amount of heat energy to be applied to the build surface to achieve the deposition temperature based on one or more of the geometry of the build surface, the distance of the build surface from the build platform, the temperature of the build platform and the temperature of the build surface; and controlling the power to the coil based on the amount of heat energy to be applied to the build surface.

19. The method of claim 12, wherein the three-dimensional printing system includes at least two induction coils for carrying out the inductive heating, the method further comprising protecting the printhead from magnetic flux generated by the at least two induction coils using conductive shielding positioned between the at least two induction coils and the printhead.

20. The method of claim 19, further comprising cooling the conductive shielding while depositing the print material.

* * * * *